Patented Dec. 4, 1951

2,576,910

UNITED STATES PATENT OFFICE 2,576,910

PROCESS FOR THE GELATINIZATION OF CELLULOSE ACETATE

Richard D. Dunlop, Dickinson, Tex., assignor to Monsanto Chemical Company, St. Louis, Mo., a corporation of Delaware No Drawing. Application September 28, 1948, Serial No. 51,651

5 Claims. (Cl. 106—177)

This invention relates to a process for preparing homogeneous masses from cellulose acetate. More particularly, the invention relates to a method of processing cellulose acetate containing from 51-57% combined acetic acid to obtain homogeneous masses that are free from uncolloided or ungelatinized particles.

Cellulose acetate containing from 51-57% combined acetic acid is used to prepare sheets, rods, tubes, films, foils and molding powders. It is easily compounded with a wide variety of plasticizers or fillers and is much more soluble in common organic solvents than the so-called cellulose triacetates which have combined acetic acid contents of from 58-62.5%.

In the conventional operating steps for preparing sheets, films, molding powders, etc., from cellulose acetate containing from 51-57% combined acetic acid, the acetate, in flake or powder form, is mixed with solvent and generally with a plasticizer or mixture of plasticizers. The materials are mixed together at room temperature or at temperatures slightly above room temperature in double-bladed dough-type mixers. The products of this mixing action frequently contain numerous small particles of cellulose acetate which have not been colloided or gelatinized, i. e., they still appear in the mixture as individual white particles which have not been affected by solvent or plasticizer. In order to gelatinize these particles, it is necessary to subject the mixture to vigorous malaxating action on heated milling rolls. Even this vigorous action sometimes fails to completely gelatinize all of the cellulose acetate particles. Articles made from mixtures containing uncolloided particles contain unsightly white specks which destroy their commercial value.

Furthermore, the vigorous mechanical action on the heated roll mills tends to degrade the cellulose acetate and to increase the basic color with the result that articles made therefrom are weaker and more brittle than they should be and have a deep yellowish brown color.

The presence of the uncolloided or ungelatinized particles at the end of the normal mixing cycle may be due to the formation of a coating of gelatinized cellulose acetate around particles or aggregates of uncolloided material. The coating thus formed acts as an efficient barrier for the penetration of added solvent and plasticizer to the raw particles.

It is an object of this invention to provide a process for the production of homogeneous masses from cellulose acetate containing from 51-57% combined acetic acid.

A further object is to provide a process for the complete gelatinization of cellulose acetate particles.

Another object is to provide a process for the gelatinization of cellulose acetate particles which eliminates the necessity for vigorous mechanical treatment.

These and other objects are attained by premixing cellulose acetate containing from 51 to 57% combined acetic acid with solvents at temperatures below $-20°$ C. and, before swelling or gelatinization occurs, raising the temperature of the mixture to at least $+15°$ C. and thereafter causing the mixture to gelatinize at temperatures of $+15°$ C. or above.

The following examples are given in illustration and are not intended as limitations on the scope of this invention. Where parts are mentioned, they are parts by weight.

EXAMPLE I 100 parts of cellulose acetate flake having a combined acetic acid content of about 53% were mixed at $-40°$ C. with 15 parts of methyl phthalyl ethyl glycollate, 10 parts of triphenyl phosphate, 7 parts of dimethyl phthalate, 5 parts of diethyl phthalate, 53 parts of acetone, and 17 parts of ethyl alcohol in a double-bladed dough-type mixer. After about 3 minutes, the mix took on the character of wet sand, all of the particles of the cellulose acetate being thoroughly wetted with the solvent-plasticizer mixture. Mixing was continued for 7 to 8 minutes longer at $-40°$ C. during which time no gelatinization or swelling took place. The temperature of the mix and mixer was then raised to about $+25°$ C. and the mixing action was continued. Within 30 minutes the cellulose acetate appeared to be completely gelatinized and when extruded into a thin transparent film, no white specks could be discovered, even on microscopic examination.

When the same composition was mixed at room temperature for one hour and then malaxated on a heated roll mill for a second hour, followed by extrusion into a thin sheet, numerous small white specks were visible to the unaided eye. A number of the white specks were isolated and analyzed. The analysis proved conclusively that the specks were cellulose acetate in the uncolloided state.

Six more mixes were made, using the ingredients listed in the following table.

Table

| Example | II | III | IV | V | VI | VII |
|---|---|---|---|---|---|---|
| Cellulose acetate | 100 | 100 | 100 | 100 | 100 | 100 |
| Methyl phthalyl ethyl glycollate | 15 | 15 | 15 | 15 | 15 | 15 |
| Triphenyl phosphate | 10 | 10 | 10 | 10 | 10 | 10 |
| Dimethyl phthalate | 7 | 7 | 7 | 7 | 7 | 7 |
| Diethyl phthalate | 5 | 5 | 5 | 5 | 5 | 5 |
| Acetone | 53 | 44 | 35 | 26 | 35 | 95 |
| Alcohol | 17 | 26 | 35 | 44 | 35 | 5 |

The numbers referred to in the above examples are parts by weight.

In each of the Examples II–VII the plasticizers were dissolved in the solvents (acetone and alcohol) and then cooled to −40° C. The cooled mixture was then added to the cellulose acetate in flake form which has been precooled to −40° C. The combined acetic acid content of the cellulose acetate in Examples II—V was 53%, in Example VI 51% and in Example VII 57%. The precooled plasticizer-solvent mixtures were mixed with the precooled cellulose acetates for about 10 minutes in a double-bladed dough-type mixer. The resultant mixtures had the appearance of coarse wet sand and there was no evidence of swelling or gelatinization. The temperature was then raised to +60° C. and mixing was continued. Within 15 minutes clear homogeneous doughs were obtained which could be extruded or otherwise formed into thin transparent sheets in which no white specks or uncolloided cellulose acetate could be detected.

Sheets prepared from the mixes made in accordance with Examples I–VII were somewhat tougher than sheets made by the standard processes and were much lighter in color.

The essence of this invention is the premixing of the cellulose acetate with solvents and, if desired, plasticizers at temperatures low enough to prevent gelatinization or swelling of the cellulose derivative particles. The premixing temperature may be as high as −20° C. but preferably, is −40° C. or lower. At temperatures between −20° C. and −40° C., the mixing period is quite critical since at −20° C. incipient gelatinization and swelling may be observed within 3 minutes. The retardation of the gelatinization becomes progressively greater as the temperature is reduced so that at −40° C. the ingredients may be mixed for from 10–20 minutes without incipient gelatinization or swelling, and at −50° C. the mixing may be continued for 30 minutes if desired. At temperatures above −20° C., gelatinization begins almost immediately with consequent formation of impervious coatings on many cellulose acetate particles which coatings apparently prevent the complete gelatinization thereof. If desired, the temperature of the premixing operation may be reduced to −75° C. or lower, the limit of temperature reduction being determined by the freezing point of the solvent-plasticizer mixture. However, it is preferred to confine the premixing to temperatures ranging from about −35° C. to about −45° C., since these temperatures allow efficient and rapid mixing of the materials without immediate danger of gelatinization.

The cellulose acetate which may be used in the process of this invention contains from 51 to 57% combined acetic acid which corresponds to an acetyl content of from 36.5% to 39%. Within these limits, the cellulose acetate varies slightly in solubility, compatibility with plasticizers, and other properties such as hardness, base color, moisture sensitivity, etc.

The cellulose acetates of this invention are soluble in a wide variety of organic solvents. Thus, the acetone and ethyl alcohol shown in the examples may be replaced in whole or in part by methyl ethyl ketone, methanol, propanol, isopropanol, butanol, pentanols, glycol ethers, glycol esters, ethyl acetate, butyl acetate, amyl acetate, ethylene dichloride, dioxane, toluene, xylol, etc. The particular solvent combination used will depend on the solubility characteristics of the particular cellulose acetate used and on the properties desired in the final mix. It is not necessary to use a combination of solvents since in many cases it may be possible to use a single solvent. The amount of solvent may be varied from about 40 parts to about 200 parts based on 100 parts of cellulose acetate. In some cases, it may be desirable to omit the solvent entirely, depending on the plasticizer alone for the gelatinization.

For most uses of cellulose acetate, it is desirable to use a plasticizer or a mixture of plasticizers, although unplasticized sheets and films are sometimes prepared. Any of the well known plasticizers for cellulose acetate may be used alone or in admixture with one another. Among the usable plasticizers are camphor, esters, amides, oils, etc. including esters of phthalic acid, sebacic acid, phosphoric acid, alkyl phthalyl alkyl glycollates, glycol esters, sulfonamides, etc. Since a number of the plasticizers are solid at the temperatures of the process of this invention, it is advantageous to dissolve them in the solvent prior to cooling the solvents to the low temperature required. In fact, many of the more popular plasticizers could not be used in the process if they were not soluble in the solvents used. The amount of plasticizer may be varied from 0 up to 150 parts per 100 parts of cellulose derivative, depending on the properties desired in the final product.

Since it is recognized generally that a plasticizer is a solvent which is relatively high-boiling and which is non-volatile, the term "solvent" in the appended claims is intended to mean both low-boiling solvents and the high-boiling solvents or plasticizers.

Other conventional ingredients such as pigments, dyes, fillers, lubricants, etc., may be added to the compositions, either in the premixing step or in the final mixing step.

The final mixing step resulting in the complete gelatinization of the cellulose acetate may be carried out at temperatures of +15° C. or above. It has been found that this final mixing may be materially shorter than the normal mixing cycle using the standard mixing procedure. For example, a 10-minute premixing cycle followed by a 30-minute final mixing at +25° C. will result in the complete gelatinization of the cellulose acetate particles, whereas the standard mixing cycle without the premixing step is generally at least one hour, and frequently must be followed by another hour on the malaxating rolls. If desired, the final gelatinization step may be carried out at elevated temperatures, providing care is taken to prevent flash fires, excessive evaporation of solvent and plasticizers, etc. The higher temperatures up to about 100° C. will be most frequently used when the composition contains no active solvent. However, it is generally unnecessary to use such high temperatures after the cold premixing step of this invention.

The process of this invention is particularly adaptable to continuous mixing processes. The premix may be maintained constantly at the desired low temperature with additional ingredients being added at about the same rate as the mixed ingredients are drawn off. The mixed material may be drawn off continuously by a worm or other device and led thence through a worm extruder or other continuous mixing device to a die or other means for forming the desired article. Due precautions must be taken in such a continuous process to move the materials through the premixing apparatus so fast that no gelatinization occurs.

It is obvious that many changes may be made in the processes and products of this invention without departing from the spirit and scope thereof as defined in the appended claims.

What is claimed is:

1. A process for the gelatinization of cellulose acetate containing from 51% to 57% combined acetic acid which comprises mixing the cellulose acetate for from 3 to 30 minutes at from —20° to —50° C. with at least one organic compound which is a solvent for the cellulose acetate and, before gelatinization occurs, raising the temperature of the mixture rapidly to +15° C. and continuing the mixing at temperatures above +15° C. to bring about gelatinization.

2. A process as in claim 1 wherein the organic compound is a low-boiling solvent.

3. A process as in claim 1 wherein the organic compound is a high-boiling solvent.

4. A process as in claim 1 wherein a plurality of organic compounds is used.

5. A process as in claim 4 wherein the organic compounds are a mixture of low-boiling and high-boiling solvents.

RICHARD D. DUNLOP.

REFERENCES CITED

The following references are of record in the file of this patent:

UNITED STATES PATENTS

| Number | Name | Date |
|---|---|---|
| 1,978,071 | York | Oct. 23, 1934 |

FOREIGN PATENTS

| Number | Country | Date |
|---|---|---|
| 380,214 | Great Britain | Sept. 15, 1932 |